Sept. 9, 1930.     C. T. RAULE     1,775,408
HIGH SPEED BEARING
Filed Oct. 7, 1926     2 Sheets-Sheet 1
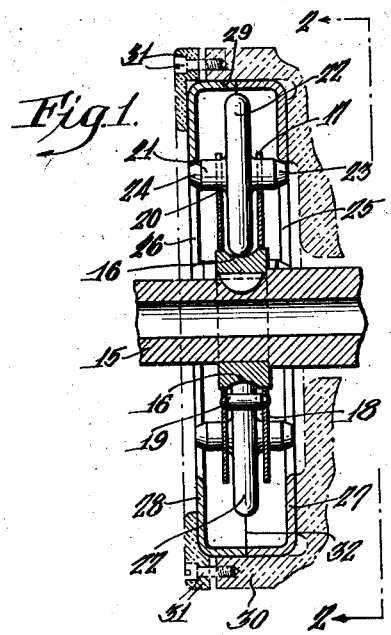
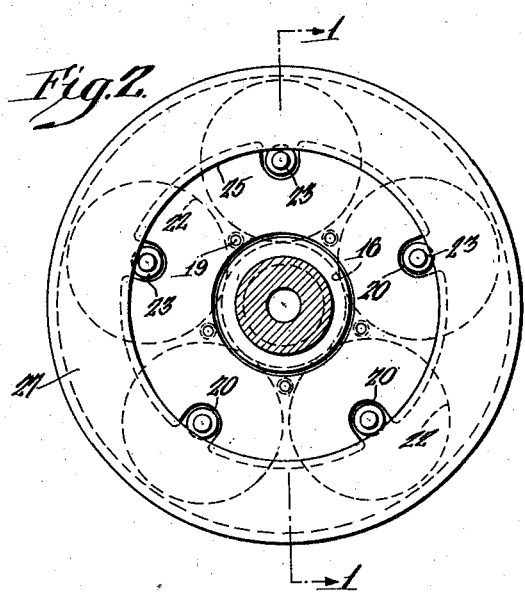
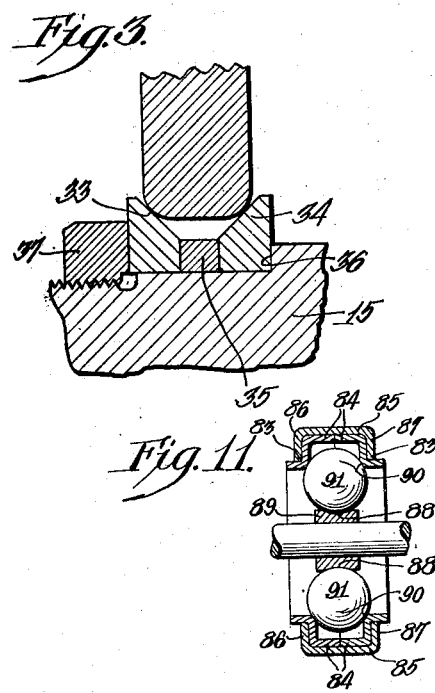
Inventor:
Clifford T. Raule
by
Attorney Sept. 9, 1930.    C. T. RAULE    1,775,408
HIGH SPEED BEARING
Filed Oct. 7, 1926    2 Sheets-Sheet 2
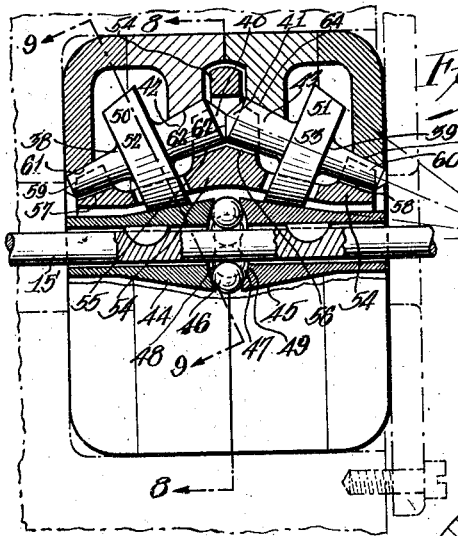
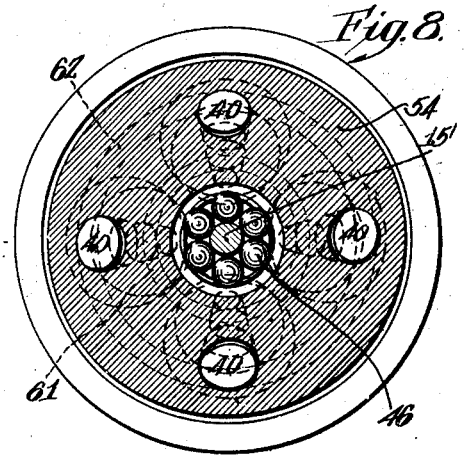
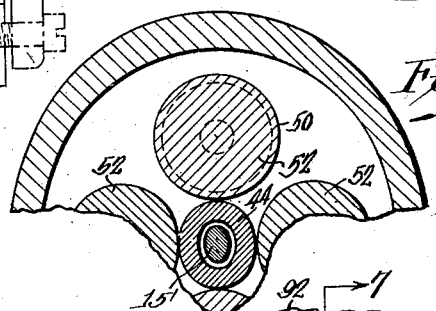
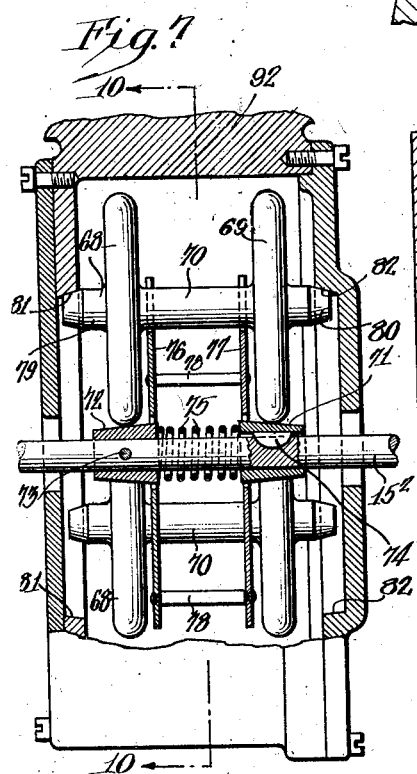
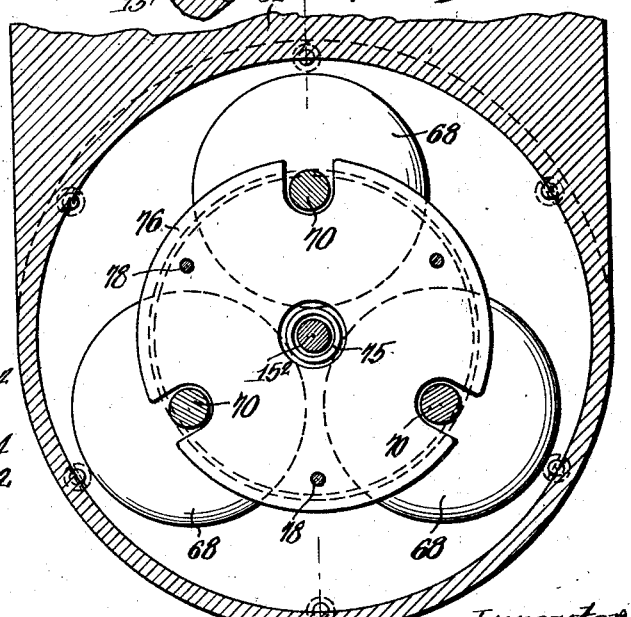
Inventor
Clifford T. Raule Patented Sept. 9, 1930

1,775,408

UNITED STATES PATENT OFFICE

CLIFFORD T. RAULE, OF BROOKLINE, PENNSYLVANIA

HIGH-SPEED BEARING

Application filed October 7, 1926. Serial No. 140,033.

My invention relates to low friction bearings for shafts and spindles, for advantageous use with shafts and spindles of any speed, but particularly advantageous with shafts and spindles that have to revolve at extremely high speeds.

A purpose of my invention is to reduce the peripheral speed between a roller bearing and its stationary race.

A further purpose is to support a high speed spindle by means of inner and outer races and wheel-and-axle rollers circumferentially spaced around the spindle, the wheels rolling around the outside of the inner race which is carried by the spindle and the wheel axles rolling around the inside of an outer race coaxial with the spindle and stationary or driven.

A further purpose is alternatively to use conical or cylindrical, single or double, wheel-and-axle roller bearing units in the low friction support of a revolving spindle.

A further purpose is to rotate a shaft upon surfaces of rolling bodies of relatively large diameter and to roll the bodies along surfaces of supports upon which they roll at relatively small diameters.

Further purposes will appear in the specification and in the claims.

I prefer to illustrate my invention in a few only of its different forms, selecting forms however that are practical and efficient in operation and which illustrate particularly well the principles involved.

Figure 1 is a fragmentary section showing one form of my invention applied to a high speed spindle, being a section taken upon the line 1—1 of Figure 2.

Figure 2 is a section of Figure 1 taken upon the line 2—2 thereof.

Figures 3, 4 and 5 are enlarged fragments of modified details of Figure 1.

Figures 6 and 7 are fragmentary vertical sections illustrating my invention in different forms of double wheel-and-axle roller bearing units.

Figures 8 and 9 are sections of Figure 6 taken upon the lines 8—8 and 9—9 respectively.

Figure 10 is a section of Figure 7 taken upon the line 10—10 thereof.

Figure 11 is a longitudinal section of a further form.

Like numerals refer to like parts in all figures.

Referring to the drawings and describing in illustration and not in limitation:—

In the grinding art the velocity of revolving spindles carrying very small grinding wheels is limited only by inability to obtain higher velocities.

Velocities of 100,000 revolutions per minute are in order with wheels of about one-quarter inch in diameter and far higher velocities than this are desirable for smaller wheels when obtainable, and an important advantage of my invention lies in its adaptation to such velocities by means of its very low friction.

The high heat developed in the ordinary roller or ball bearing unfits it for use at such velocities.

As an illustration the rollers and the roller spacers for a spindle revolving at 100,000 revolutions per minute would ordinarily have to circle the spindle and roll around the circular race, something like 60,000 revolutions per minute, or a thousand times a second which is too high.

I very greatly reduce the circling velocity of the spacers and of rolling contact at the races by having wheel-and-axle instead of ball or cylindrical rollers, rolling the wheels around the outside of a race upon the spindle, and the axles of the wheels around the inside of an outer race.

In this way I very greatly reduce the velocity of the roller spacers and of the parts making roller engagement with the outer race.

In Figures 1 and 2 the high-speed spindle 15 carries rigidly fastened to it an inner race 16. The wheel-and-axle roller units 17 are circumferentially spaced by spacer plates 18 which are riveted together at 19 and recessed at circumferentially spaced intervals at 20 to receive the oppositely extending axles 21 of the respective wheels 22. The taper ends 23 and 24 of the opposite axles make rolling engagement with outer taper races 25 and 26, and the wheels 22 with the inner race 16.

The outer races 25 and 26 are straight or convexly tapered annular surfaces of members 27 and 28 that fit together within a bore 29 of a housing or drive member 30 to which they are rigidly fastened in any suitable way, as by a follower ring screw clamp 31.

The taper surfaces of the races engage the taper ends of the axles. Preferably this engagement is along a line engagement rather than along a band inasmuch as there is pure rolling friction in the one case as against a mixture of rolling and sliding frictions in the other.

In Figure 1 I show the outer races 25 and 26 having a convexly curved taper and the ends of the axles with straight taper. In the fragmentary Figure 5 I show the races with a straight taper and the ends of the axles convexly curved and in Figure 4 show both the race and the end of the axle convexly curved.

In the structure of these figures the friction at the outer race is of pure rolling.

The race members 27 and 28 are desirably counterparts and any wear at the bearing surfaces may be taken up by facing off one or both of these members at 32.

Where the inner race 16 is of such form that the longitudinal position of the wheel-and-axle roller units 17 with respect to the spindle 15 should not be changed it will usually be found best to face both of the race members 27 and 28 when taking up for wear.

The inner race 16 fastened to the shaft may present to the rolling wheels a concave groove as in Figure 1 or may comprise double cone faces as shown in Figure 3.

In the arrangement of Figure 3 there are two lines of rolling engagement between the wheels and the race, the cone 33 engaging the wheels upon one side while the cone 34 engages them on the other side. This form is well adapted to prevent any longitudinal play of the spindle.

The inner race in Figure 3 is made up of facing conical rings 33 and 34 and an intermediate ring 35, the three rings being clamped to place between a shoulder 36 of the spindle and a nut 37 threaded upon the spindle.

When taking up wear the nut 37 may be removed and the outer conical ring 33 and spacing ring 35 both taken out and the spacing ring then faced upon one or both sides and put back.

The amount taken off the face of the intermediate wheel in adjusting for wear will depend upon the extent and the location of the wear.

The wheel-and-axle roller units illustrated in Figures 1 to 5 might be called of the single-wheel type in that each roller unit has but a single wheel with an axle extending along its axis at each side.

Figures 6 to 10 illustrate double-wheel types of wheel-and-axle roller units in which two wheels cooperate in each complete roller unit.

In Figures 6, 8 and 9 the double wheel-and-axle unit is made up of cooperating separate and reversely sloping conical wheel-and-axle units 38 and 39 that engage and support one another at the conical ends 40 and 41 of their adjacent outer axles 42 and 43 respectively.

In this structure the spindle 15 carries reversely sloping conical races 44 and 45 which are adapted to slide apart along the spindle under the action of centrifugal balls 46 spaced around the cone races in sockets 47 formed by registering recesses 48 and 49 of the cooperating cone races 44 and 45 respectively.

The tendency for the balls 46 to push apart the cone races is supported by engagement between the inner races and the conical circumferences 50 and 51 of the wheels 52 and 53.

The conical wheel-and-axle cooperating units 38 and 39 are loosely mounted in a spacer ring 54 in such a way that their axes intersect at the outer ends 40 and 41 of the engaging axles 42 and 43, the spacer ring being suitably recessed at 55 and 56 to receive the axles 42 and 43 and at 57 and 58 to receive the axles 59 and 60.

When the spindle 15' revolves at high velocity the conical wheel-and-axle rollers 38 and 39 tend to slide up along the slope inside the conical races 61 and 62 of the unit 38 and 63 and 64 of the unit 39.

This is due to the strong centrifugal action and actual motion up the slopes of the outer races is prevented by the engagement between the larger ends of the axles of the respective cooperating rollers.

In practice the apices of the conical bearing surfaces upon each side of the double bearing should preferably coincide and lie within the axis of the spindle 15'. Thus the point 65 is a common apex of the inner and outer races 45 and 63 and 64, and of the axles 60 and 43 and of the wheel 51, while a corresponding point not shown but also lying in the axis of the spindle 15' is a common apex of corresponding bearing surfaces on the other side.

The engaging ends of the axles 42 and 43 should also be cones with tangential engaging elements 67 perpendicular to the revolving spindle.

With these conditions the friction is one of pure rolling.

In the form shown in Figures 7 and 10 each double wheel-and-axle roller unit is an integral member carrying two wheels 68 and 69 having an axle 70 parallel to the revolving spindle $15^2$.

The inner races 71 and 72 comprise conical sleeves turning with the spindle $15^2$ and adapted to relatively slide along the revolving spindle. One is shown pinned to the spindle at 73 and the other as splined to the spindle at 74.

The conical races are spring-pressed apart by a spring 75 which maintains the races in proper engagement with the surfaces of the wheels 68 and 69. Spacing rings 76 and 77 are shown between the wheels. These are riveted together at 78 and the rolling axles are extended at 79 and 80 to roll around the outer races 81 and 82.

Obviously the rolling engagement between the axle and the outer races might be made between the wheels instead of outside the wheels, and in this event the spacer might be placed outside instead of between the wheels if desired.

The wheel-and-axle roller units are particularly well adapted to high-speed driving of the spindle.

In the form shown in Figure 11 the outer races 83 are formed in a transversely split casing 84 held together by a shell 85 which for convenience may be flanged at one end 86 and spun in at the other end 87. The inner race 88 is formed in a ring 89 secured to the shaft in any suitable manner.

The outer and inner races here bear upon the same spherical surface 90 of ball 91 but at points of greatly different diameter with respect to the axis about which the ball is rotating. The inner race is engaged by the ball at approximately its outer circumference and the outer race is engaged by a part of the ball near the axis of the ball. I thus secure an effect similar to that secured in the other figures though with necessarily a steeper surface angle where the ball is engaged by the outer race.

In each of the forms shown the outer races may be fastened rigidly to a member 92 that may comprise either a stationary housing or a relatively low velocity driving sleeve coaxial with the spindle and turning in suitable bearings not shown.

This low friction drive is described in greater detail and claimed in an application that is intended to be copending herewith, entitled "Drive for high-speed spindles".

In view of my invention and disclosure variations and modifications to meet individual whim or particular need will doubtless become evident to others skilled in the art, to obtain part or all of the benefits of my invention without copying the structure shown, and I, therefore, claim all such in so far as they fall within the reasonable spirit and scope of my invention.

Having thus described my invention what I claim as new and desire to secure by Letters Patent is:—

1. A spindle, a pair of reversely facing conical inner raceways carried on the spindle, a pair of reversely facing outer conical raceways, and end-to-end conical wheel-and-axle rollers circumferentially spaced around the spindle having rolling wheel engagement with the respective inner raceways and rolling axle engagement with the respective outer raceways.

2. A spindle, a pair of reversely facing conical inner raceways carried on the spindle, a pair of reversely facing outer conical raceways having apices approximately coincident with the respective apices of the inner raceways, and end-to-end conical wheel-and-axle rollers circumferentially spaced around the spindle having rolling wheel engagement with the respective inner raceways and rolling axle engagement with the respective outer raceways and having apices upon the respective sides approximately coincident with the apices of the outer and inner raceways.

3. A spindle, a pair of reversely facing conical inner raceways carried on the spindle, a pair of reversely facing outer conical raceways having apices approximately coincident with the respective apices of the inner raceways, end-to-end conical wheel-and-axle rollers circumferentially spaced around the spindle having rolling wheel engagement with the respective inner raceways and rolling axle engagement with the respective outer raceways, and centrifugal means pressing the inner raceways apart longitudinally to maintain contact between the raceways and the rollers.

4. A spindle, a pair of reversely facing conical inner raceways carried on the spindle, a pair of reversely facing outer conical raceways having approximately coincident apices with the inner raceways, end-to-end and conical wheel-and-axle rollers circumferentially spaced around the spindle having rolling wheel engagement with the respective inner raceways and rolling axle engagement with the respective outer raceways and a spacer around the inner raceways positioning and seating the rollers end to end so that their axes intersect.

CLIFFORD T. RAULE.